Nov. 5, 1957 C. E. CUSHMAN 2,812,201
QUICK DISCONNECT COUPLING
Filed Oct. 1, 1953 2 Sheets-Sheet 1

INVENTOR.
CLIFFORD E. CUSHMAN
BY
ATTORNEY

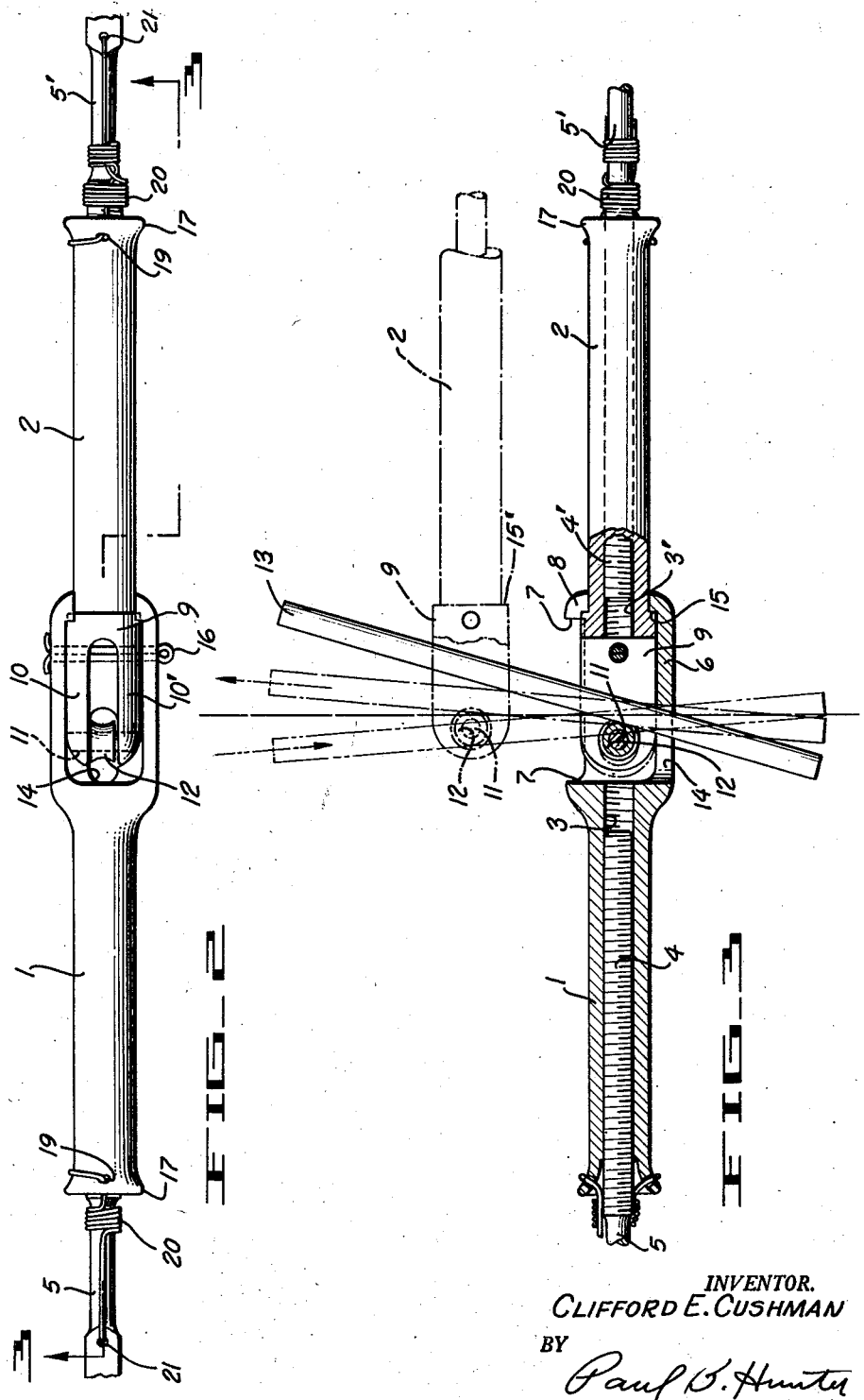

United States Patent Office 2,812,201
Patented Nov. 5, 1957

2,812,201

QUICK DISCONNECT COUPLING

Clifford E. Cushman, Burbank, Calif., assignor, by mesne assignments, to Pacific Scientific Aeroproducts, Glendale, Calif., a corporation of California Application October 1, 1953, Serial No. 383,599

7 Claims. (Cl. 287—60)

This invention relates generally to a coupling or connector for quickly connecting or detaching ropes or cables such as the control cables for aircraft, and the invention relates more particularly to a novel quick disconnect coupling serving such purposes.

The coupling of the present invention is capable of use in all places where a cable connector or turnbuckle is of use, and the device of this invention can be inserted in lieu of a turnbuckle and serves not only for adjusting the tension of cables but also provides for the quick connecting or disconnecting of the cable ends which is impossible when using a turnbuckle.

The principal object of the present invention is to provide a novel quick disconnect coupling that is of rugged, yet extremely simple, design, inexpensive to manufacture, and comprising essentially two parts without the use of any interconnecting lever or handle normally used for bringing the parts together in prior devices.

Another object of the present invention is to provide a novel coupling of the above character, which consists essentially of a body member and a cooperating barrel member, the said body member having a socket portion, and the barrel member having a head portion adapted to fit into the socket portion to effect the coupling of the members, the said body and barrel members being reversely threaded therethrough for receiving the oppositely threaded shanks of turnbuckle yokes; the said coupling having means for enabling the quick coupling and uncoupling of the same while providing means for preventing accidental uncoupling should the cable or other member connected become slack; and said coupling being constructed for receiving safety wiring to prevent accidental unscrewing of the turnbuckle shanks, and being interchangeable with an ordinary turnbuckle.

Another object of the present invention is to provide a novel coupling of the above character which enables the rapid rigging of the control cables in aircraft due to the use of the toggle arrangement embodied in the coupling and the rapid connecting and disconnecting nature of the coupling, without the necessity of using special tools or a handle.

Other objects of the invention will become apparent as the description proceeds.

In the drawings:

Fig. 2 is a plan view showing the parts in coupled relation.

Fig. 3 is a part sectional elevational view illustrating another way of coupling and uncoupling the device.

Similar characters of reference are used in all the figures to designate similar parts.

Figure 1:
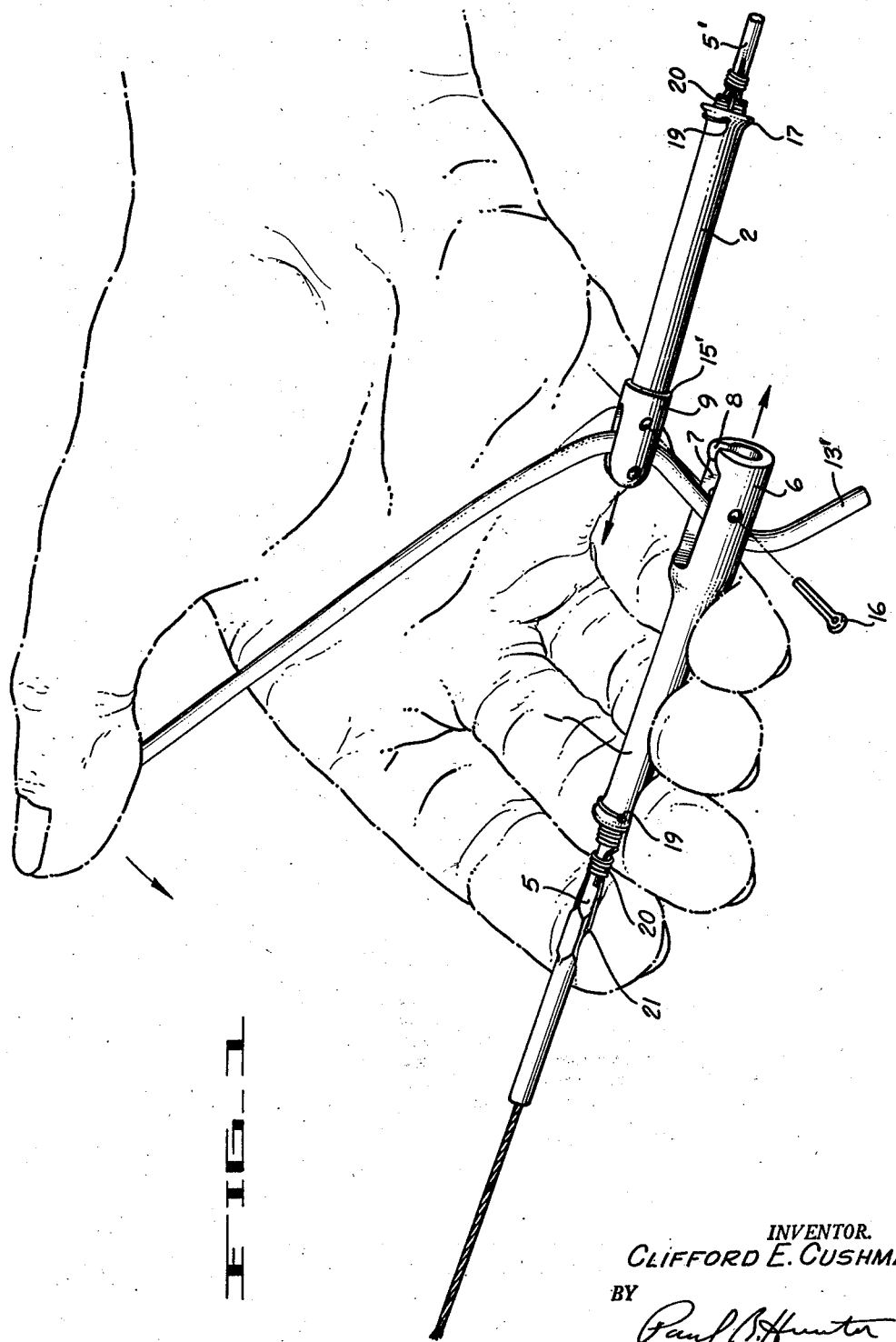
Fig. 1 is a perspective view illustrating one manner of quickly coupling the body and barrel members of the connector or coupling.

Referring now to the drawings, the reference numeral 1 designates the body member of the coupling, and the reference numeral 2 designates the cooperating barrel member of the coupling. The body member 1 is of substantially cylindrical shape, and is internally threaded at 3 for receiving the threaded stem 4 of a turnbuckle shank or yoke 5. The barrel member 2 is also internally threaded at 3' to receive the oppositely threaded stem 4' of a turnbuckle shank or yoke 5'. The body member 1 is provided with an enlarged, hollow, substantially cylindrical, head portion 6 having an opening 7 at one side thereof communicating with a smaller U-shaped opening 8 at the free end thereof for receiving the somewhat enlarged bifurcated head 9 provided on the barrel member 2. The branches 10 and 10' of the bifurcated head 9 carry a pin 11 upon which is mounted a roller 12 having a concave peripheral surface for rotatably engaging a small rod or wire 13 which may take the form of a straight rod as shown in Fig. 3 or a bent rod 13' as shown in Fig. 1. The rod 13 or 13' is merely used in assembling and dissembling the coupling and in turning the coupling around when it is desired to draw up on or slacken off on the cable when using the turnbuckle action of the coupling.

It will be noted that the shanks of the body member 1 and that of the barrel member 2 are threaded completely through these members so as to provide a relatively extensive adjustment of the turnbuckle action when desired, bearing in mind that the coupling of the present invention can be interchanged readily with a standard turnbuckle when desired. The head portion 6 of the body member is provided with a substantially oval-shaped opening 14 opposite the opening 7 in this head portion for accommodating the rod 13. The opening 14 is of such dimensions that when the rod 13 is inserted therethrough and under the roller 12, the members 1 and 2 can be connected or disconnected at will. The inner surface of the outer portion of the head 6 is provided with a recessed substantially annular seat 15 upon which the shoulder 15' of the head 9 of the barrel member will seat when members 1 and 2 are connected. With the members assembled as shown in Fig. 2, a cotter pin 16 is inserted through aligned holes extending through the head portion 6 of the body and head 9 of the barrel to thereby prevent these members from separating should the cable become slack.

Thus, assuming the parts 1 and 2 are coupled together as shown in Fig. 3, to disconnect these members the cotter pin 16 is removed, the rod 13 is inserted through hole 14 as shown in solid lines in this figure, and then this rod is turned counter-clockwise against the tension cable, if any, into the middle or first dot-dash position shown in the drawings, whereby the roller 12 is pushed to the left so that shoulder 15' disengages seat 15, and the barrel member 2 then clearing the edge of opening 7 tends to roll by means of roller 12 outwardly, as shown by the arrow in the drawing, down the rod into the dot-dash position shown in Fig. 3, so that the members are thus easily and quickly separated, the relative positions of the roller 12 and slot 14 when the members are assembled being such as to facilitate this easy separation. To couple the member together, it is merely necessary to insert the rod and turn the members to the second dotted line position, whereupon the barrel member rolls inwardly as shown by the arrow so that its head 9 enters the head portion 6 and can then be secured therein by the cotter pin 16. With the members assembled as shown in Fig. 3, the rod 13 can be turned or rotated bodily about the longitudinal axes of the coupling, thereby effecting the tightening or loosening of the connected cables by virtue of the turnbuckle action.

In Fig. 1, the body and barrel members are shown being connected through use of the bent rod 13' which has been inserted through the opening 14 bearing against one end thereof and serving to press the head 9 by acting through the roller 12 towards the left in the figure and into the opening 7, so that the shoulder 15' becomes seated within the cooperating recessed seat 15 of the head member 6, whereupon the cotter pin 16 can be inserted to secure the members together. The body and barrel members are provided with somewhat flared outer ends 17 in the nature of turnbuckle barrels. Inwardly of the ends 17 are provided small circumferentially spaced openings 19 for receiving locking wires 20 which extend through two such openings in the body and barrel members respectively, which wires are wound around the turnbuckle shanks 5 and 5' and extend through apertures 21 provided in the square portions of the turnbuckle shanks. Owing to the use of two spaced holes in each end of the coupling, the safety-wiring can be easily looped through these holes and wrapped around the shanks or yokes 5 or 5' so that two runs of the wire are present to provide improved anti-rotational characteristics to the threaded connections, while at the same time, since the safety-wiring is wrapped around parts that are of reduced diameter, it is not exposed to chafing or abrasion in use.

One will note that the novel disconnect coupling of the present invention is of substantially the same size as a standard turnbuckle, and is interchangeable therewith, and comprises essentially two parts, i. e., the body and barrel members adapted for connection and disconnection by use of a simple rod, the rod also serving to turn the coupling when it is desired to change the tension of the connected cables through the turnbuckle action of the device. The turnbuckle shanks can be held stationary while the rod 13 is being revolved, if desired, by a special wrench holding the square portions from turning. While a roller 12 is used to facilitate the easy connection and disconnection of the coupling, it is obvious that a hardened pin or abutment could be used alone and the roller omitted, if desired.

Instead of using the rod 13 to turn the coupling to effect the turnbuckle action, the coupling can be disconnected and the members 1 and 2 turned individually easily by hand, whereupon the members 1 and 2 can be again coupled.

The novel connector of this invention is thus of extremely simple, streamlined construction and the main parts thereof designed so as to be produced on automatic screw machines. The handle or connecting link commonly used in connectors of this type has been eliminated, thus reducing complexity and cost of production. Since the body and barrel members are threaded clear through, an extensive turnbuckle adjustment can be made. It will be noted that in joining the body and barrel members, the rod 13 lines up the slot in the barrel head with the oval slot 14 in the body, thus automatically aligning the cotter pin holes in these members. Also, the connector of this invention is directly interchangeable with a standard turnbuckle.

It will be apparent to those skilled in the art that various changes can be made in the body and barrel structure disclosed and in the resulting coupling described without departing from the spirit of this invention, and therefore the same is to be interpreted in the light of the attached claims.

What is claimed is:

1. A quick disconnect coupling comprising a substantially cylindrical body member and a cooperating substantially cylindrical barrel member, said members being oppositely internally and longitudinally threaded for receiving turnbuckle shanks, said body member being provided with an enlarged, hollow substantially cylindrical head portion having a socket opening at one side thereof, said barrel member being provided with an enlarged substantially cylindrical bifurcated head adapted to be passed bodily inwardly through said socket opening for fitting into the hollow head portion of said body member by transverse relative movement of said members when coupling said members together, said body member and said barrel member having cooperating abutting portions for directly engaging each other in use for transmitting tension between the members.

2. A quick disconnect coupling as defined in claim 1, wherein said body member is provided with a smaller opening opposite said socket opening and said barrel member is provided with a transverse roller carried in the bifurcation of its head to facilitate the quick connection and disconnection of these members as through use of a rod passed through said smaller opening and said socket opening and engaging the edge of said smaller opening and said roller to move the latter to facilitate quick relative transverse movement of said members.

3. A quick disconnect coupling as defined in claim 1, wherein said cooperating engaging portions comprise an annular seat in said body member and an annular shoulder on said barrel member, said annular seat being slightly recessed, whereby said members must be moved toward each other somewhat to release said coupling.

4. A quick disconnect coupling as defined in claim 1, wherein oppositely threaded turnbuckle shanks are screwed into said body and barrel members, the cylindrical head portion of said body member having an aperture and the bifurcated head of said barrel member having a transverse connection for cooperatively engaging a rod or the like for engaging said members, not only to effect the connection and disconnection of said members but also to effect the turning of said coupling for changing the effective length thereof.

5. A quick disconnect coupling connector comprising separable substantially cylindrical mating body and barrel members provided with oppositely threaded longitudinal openings, turnbuckle yokes threaded into said openings, said body member having an enlarged, hollow head portion apertured at one side thereof and said barrel member having an enlarged head for passing bodily inwardly through the opening in the side of said body member head portion for connecting said members together, said barrel member head being bifurcated and having a transverse connection adjacent the outer end of its bifurcation, said body member head portion having a second aperture opposite its first-named aperture and adjacent said transverse connection for enabling quick connection and disconnection of said body and barrel members as through use of a rod inserted through said second aperture for exerting pressure against the transverse connection of said barrel member bifurcated head to move said head with respect to said body member head portion, such rod also serving to rotate said members bodily to vary the effective length of said connector when desired.

6. A connector as defined in claim 5, wherein movable locking means is provided for engaging said body and barrel members for preventing the accidental disconnection thereof in use.

7. A connector as defined in claim 5, wherein said body and barrel members have flared outer ends provided with radial openings located inwardly of said ends adapted to receive safety wiring wrapped around said members, said wiring being positioned radially inwardly of the flared ends of said members thereby to prevent abrasion of said wiring in use, said turnbuckle yoke stems being apertured for receiving said safety wiring thereby to prevent accidental lengthening or shortening of said connector in use.

References Cited in the file of this patent

UNITED STATES PATENTS

| 693,182 | Stone | Feb. 11, 1902 |
| 718,306 | Boring | Jan. 13, 1903 |
| 946,594 | Brock | Jan. 18, 1910 |
| 1,011,949 | Gustafsson | Dec. 19, 1911 |
| 2,041,382 | Strong | May 19, 1936 |
| 2,320,546 | Shakespeare | June 1, 1943 |
| 2,359,492 | Rockwood et al. | Oct. 3, 1944 |
| 2,462,382 | Gleason | Feb. 22, 1949 |
| 2,621,020 | Call | Dec. 9, 1952 |

FOREIGN PATENTS

| 289,355 | Germany | Dec. 20, 1915 |